United States Patent [19]

Futami

[11] Patent Number: 5,030,901
[45] Date of Patent: Jul. 9, 1991

[54] POSITION CONTROL METHOD

[75] Inventor: Shigeru Futami, 1-21-3-NS-1-601, Ninomiya, Tsukuba-shi, Ibaraki 305, Japan

[73] Assignees: Research Development Corporation of Japan, Tokyo; Shigeru Futami, Ibaraki, both of Japan

[21] Appl. No.: 424,039

[22] Filed: Oct. 19, 1989

[30] Foreign Application Priority Data

Oct. 21, 1988 [JP] Japan ................ 63-266627

[51] Int. Cl.⁵ .......................... G05D 11/36
[52] U.S. Cl. ................ 318/610; 318/611; 318/618; 318/594
[58] Field of Search ............. 318/561–640; 364/474.33, 474.35, 474.31, 474.37, 106, 190, 170, 176, 191, 150, 193, 151

[56] References Cited

U.S. PATENT DOCUMENTS

| | | | |
|---|---|---|---|
| 4,139,811 | 2/1979 | Klinger | 318/611 X |
| 4,200,827 | 4/1980 | Oswald | 318/594 X |
| 4,221,995 | 9/1980 | Barkman | 318/616 |
| 4,282,469 | 8/1981 | Moriyama | 318/640 X |
| 4,331,910 | 5/1982 | Kohzai et al. | 318/618 |
| 4,338,659 | 7/1982 | Kurakake | 318/561 X |
| 4,345,194 | 8/1982 | Green | 318/618 X |
| 4,816,734 | 3/1989 | Kurakake et al. | 318/618 X |
| 4,843,293 | 6/1989 | Futami | 318/593 X |
| 4,864,209 | 9/1989 | Seki et al. | 318/611 |

Primary Examiner—Paul Ip
Attorney, Agent, or Firm—Armstrong, Nikaido, Marmelstein, Kubovcik & Murray

[57] ABSTRACT

In a position control system having force as a manipulated variable and position as a controlled variable, negative feedback of position and velocity is performed. Positive feedback of acceleration is performed through a first order lag circuit. Alternatively positive feedback of velocity is performed through a quasidifferential circuit. By the combination of negative and positive feedback, it is possible to stabilize vibration characteristics of the mechanism, which tends to make the control system stable, and to achieve position control with high gain, high response and high accuracy.

2 Claims, 10 Drawing Sheets

POSITION CONTROL METHOD

BACKGROUND OF THE INVENTION

The present invention relates to a position control system having force as a manipulated variable and position as a controlled variable.

Figure 1:
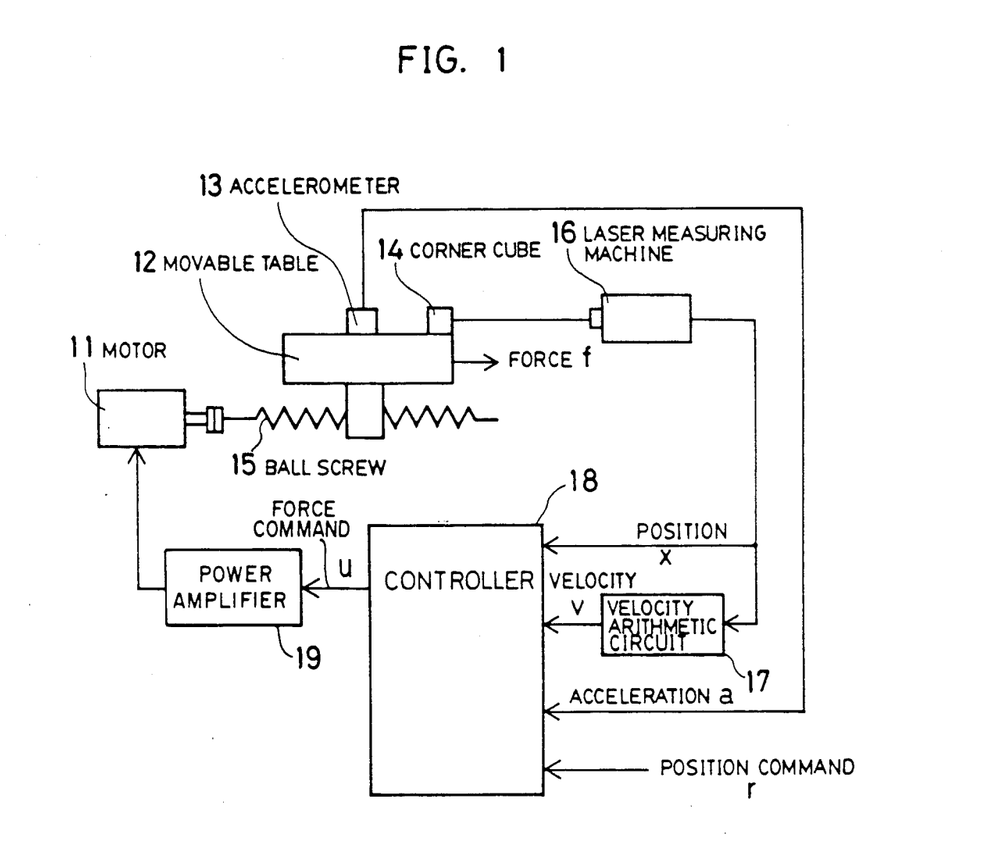
FIG. 1 shows a composition example of the position control system according to this invention.

In the position control system as shown in FIG. 1, a movable table 12, whose position is to be controlled precisely, is driven by a motor 11 through ball screw 15. The motor 11 is driven by a power amplifier 19, and a force "f" proportional to the force command "u", which is an input of the power amplifier 19, is applied on the movable table 12. On the movable table 12, a corner cube 14 and an accelerometer 13 are fixed. The position "x" of the movable table 12 is measured by the laser measuring machine 16 and corner cube 14, and the velocity "v" is obtained from the position "x", using velocity arithmetic circuit 17. Further, the acceleration "a" is measured by the accelerometer 13. The controller 18 uses the position command "r" and the position "x", the velocity "v" and the acceleration "a" as inputs and issues the force command "u" so that the position "x" follows the position command "r". In such a position control system, the present invention proposes a position control method to define the composition of the controller 18.

Suppose that, in the above position control system, the response of the motor 11 and the power amplifier 19 are sufficiently quick and linear. Then, the relation between the force "f" applied on the movable table 12 and the force command "u" output by the controller 18 is given by the following equation:

$$f = K_f u \quad (1),$$

where $K_f$ is a proportional constant.

Figure 2:
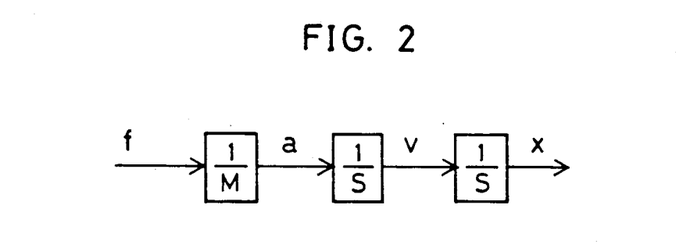
FIG. 2 is a block diagram showing the relation between the position and the force in the position control system.
Figure 3:
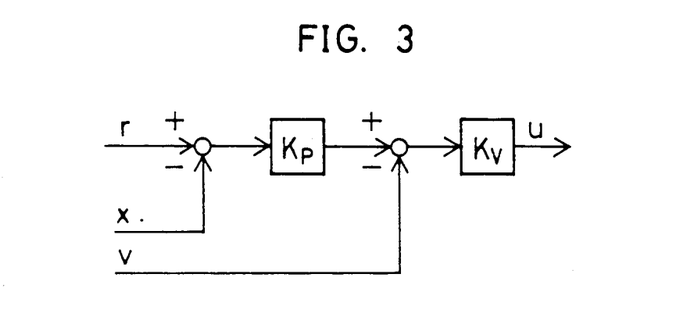
FIG. 3 is a block diagram showing the position control system, where negative feedback of the position and the velocity is performed.

If the response of the position control system is slow and the mechanism (including the motor 11, ball screw 15 and movable table 12) is a rigid body, the relation between the position "x" of the movable table 12 and the applied force "f" is obtained by:

$$M\ddot{x} = f \quad (2),$$

where M is the mass of the movable portion. This relation is shown as a block diagram in FIG. 2. Because this system is a quadratic system, the position "x" and the velocity "v" will suffice to express the quantity of state. It is known that the position control system with adequate characteristics can be composed by negative feedback of the position "x" and the velocity "v" as it is often practiced in the past. The control system is expressed by the following equation:

$$u = K_v \{K_p (r - x) - v\} \quad (3),$$

where Kp and Kv are the feedback gains. This relation is shown in FIG. 3 as a block diagram.

In general, it is expected that the position control system has higher accuracy and higher response with the increase of the gains Kp and Kv, whereas there is the limitation to this because the behavior of the mechanism cannot be assumed as that of a rigid body when the response of the position control system becomes quicker, and vibration characteristics must be taken into consideration.

Figure 4:
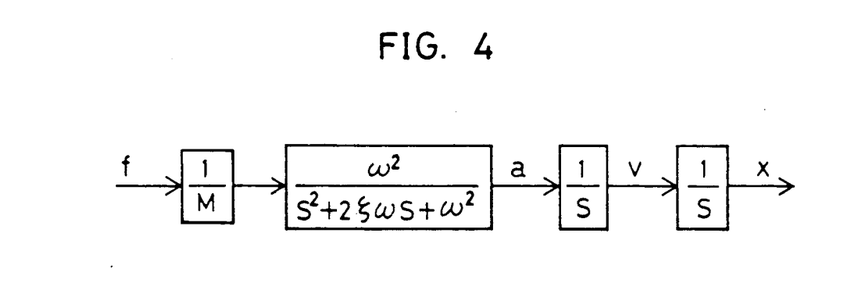
FIG. 4 is a block diagram showing the position control system giving consideration on the vibration characteristics of the mechanism.

When the vibration characteristics of the mechanism is considered, the relation between the position and the force is shown by the block diagram of FIG. 4. Here, $\omega$ and $\zeta$ are angular natural frequency and damping ratio respectively. In general, the damping ratio of the mechanism is small, and the vibration characteristics become unstable with the increase of gain.

Thus, there arises a problem in the conventional control method when vibration characteristics are no longer negligible. This will be explained below by an example.

Figure 5:
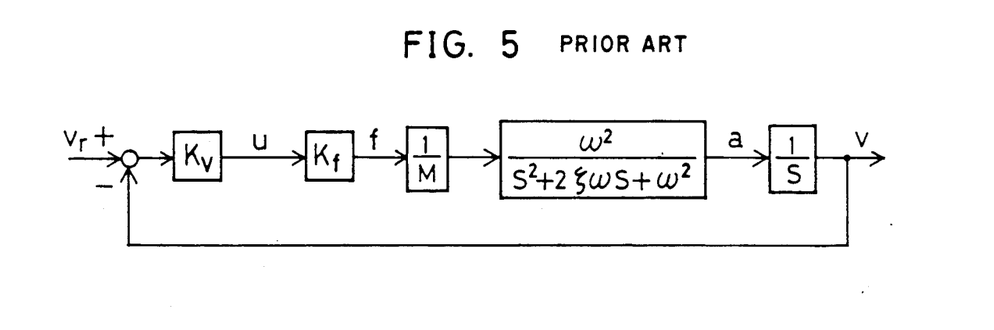
FIG. 5 is a block diagram showing the conventional velocity control system.
Figure 6:
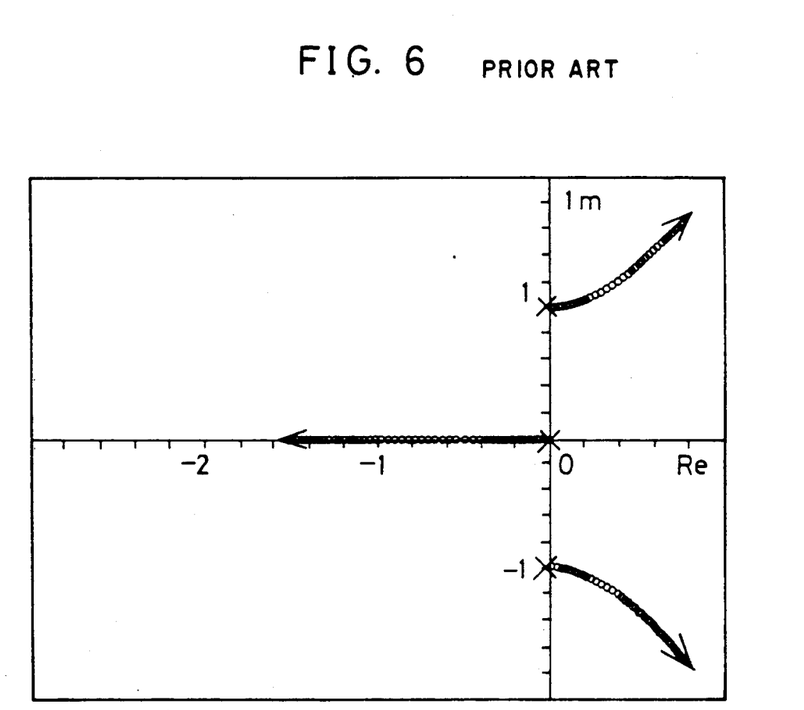
FIG. 6 is a diagram to give the root loci of the feedback system.

FIG. 5 is a block diagram showing a velocity control system by the conventional control method. FIG. 6 shows the root loci of the velocity control system as shown FIG. 5, and $v_r$ is the velocity command.

The property of the feedback control system is determined by the pole of the closed loop. FIG. 6 shows the locus (root locus) of the pole of the closed loop when the gain $K_v$ is gradually increased from 0 in this system. Here, it is assumed that $\omega = 1$ and $\zeta \approx 0$. As it is evident from FIG. 6, the vibration characteristics moves rightward, i.e. toward unstability with the increase of gain. Because the vibration roots on the imaginary axis are non-damping, i.e. instability limit, the gain must be smaller than the case of this condition. In general, the damping ratio of the mechanism is small, and it reaches the stability limit. This makes it impossible to increase the gain in the control system and to provide sufficient accuracy and response. This result does not vary significantly when negative feed back of the acceleration "a" is added in the system of FIG. 5.

In the position control system, response is slower than in the velocity control system, and sufficient characteristics can not be obtained by the conventional control method of equation (3).

SUMMARY OF THE INVENTION

The object of the present invention is to stabilize vibration characteristics in position control. Another object of this invention is to achieve the position control with quicker response and higher accuracy.

To attain these objects, the position control method according to the invention is characterized in that, in the position control system having force as a manipulated variable and position as a controlled variable, negative feedback of the position and the velocity is performed. Positive feedback of the acceleration is performed through a first-order lag circuit or the positive feedback of the velocity is performed through a quasi-differential circuit.

By the above system composition, it is possible to stabilize the vibration characteristics of the mechanism, which tends to make the control system stable and to perform position control with high gain, high response and high accuracy.

DESCRIPTION OF PREFERRED EMBODIMENTS

In the following, the embodiments of the invention will be described in connection with the drawings.

The present invention offers a method to perform proportional control of the acceleration of the mechanism having vibration characteristics by positive feedback through a first order lag circuit and to stabilize the vibration. The principle of this invention will be explained according to FIG. 7 and FIG. 8.

Figure 7:
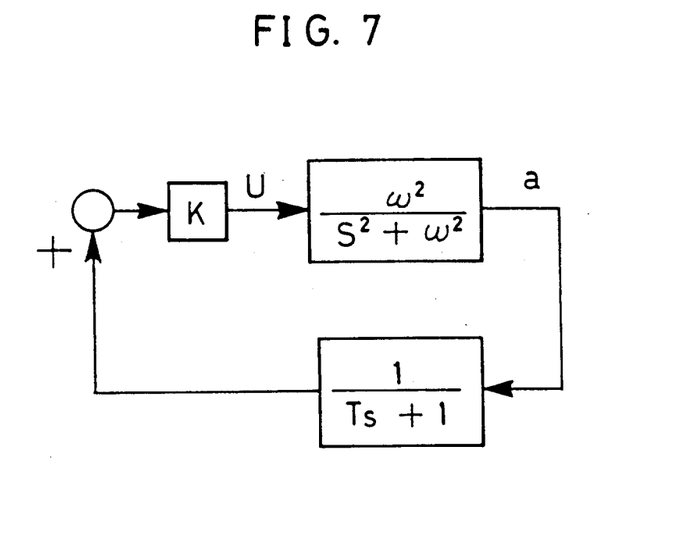
FIG. 7 is a block diagram to explain the principle of the position control system according to this invention.
Figure 8:
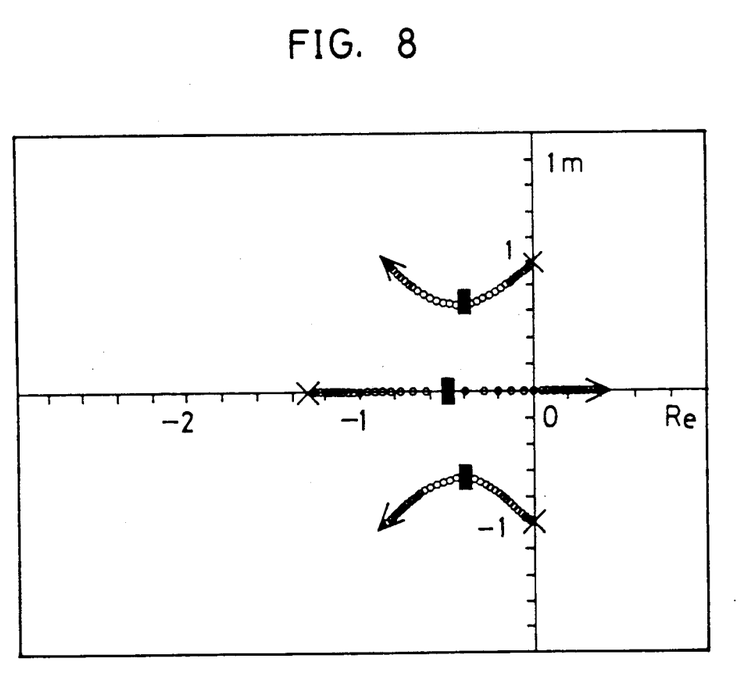
FIG. 8 is a diagram to show the root loci of the positive feedback system.

In FIG. 7, the damping ratio $\zeta$ is set to zero, assuming the worst condition as vibration characteristics. For more easier explanation, a block diagram is shown, including the contact $K_f/M$ in the gain K. FIG. 8 gives an example of the root locus of this positive feedback system. The parameters are: $\omega=1$ and $T=0.77$. To set $\omega=1$ is to normalize the time axis by an angular natural frequency of vibration, and the generality is not lost. The time constant T is a design parameter, whereas there is no substantial difference if $0.5°T°1$ to $\omega=1$.

It is evident from FIG. 8 that, with the increase of the gain K, the pole of first order lag moves toward the right on the real axis and the poles of the vibration characteristics moves toward the left. The pole on the real axis is the first order lag having a bigger time constant as it approaches the origin on the left half-plane, and it is unstable on the right half-plane. For this reason, the response of the first order element is slowed down with the increase of the gain, and it becomes unstable as soon as it passes the origin. This is the reason why the conventional positive feedback has not been used, while it is possible to keep it stable if the gain is limited. The leftward movement of the vibration characteristics means more stableness of the damping, and this is a very favorable result. The positions marked with the marks in FIG. 8 are the poles of the closed loop when the gain $K=1$, and the vibration characteristics are $\omega'=0.77$ and $\zeta=0.52$ and the first order lag is $T=2.0$. With the vibration characteristics of non-damping, the damping ratio is 0.52, and this suggests that the stabilization by this method is very effective.

Figure 9:
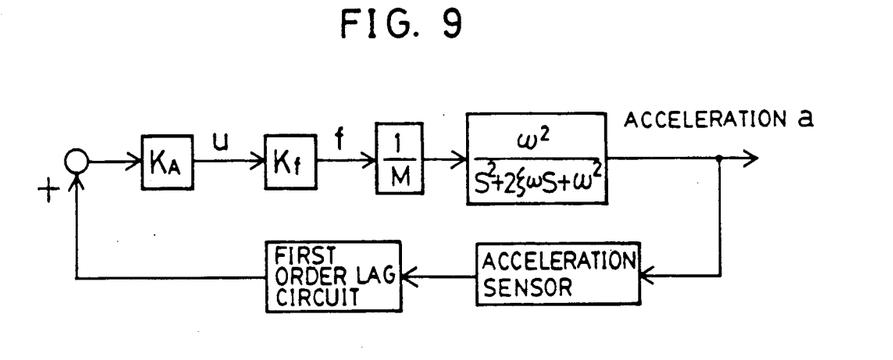
FIG. 9 and FIG. 10 are diagrams to represent the embodiments of the control system according to this invention.
Figure 10:
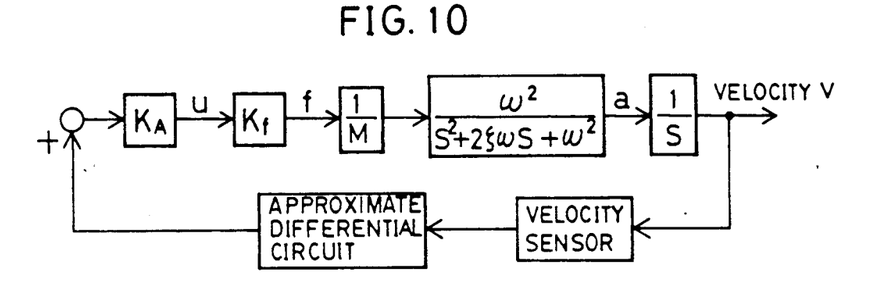
Figure 11:
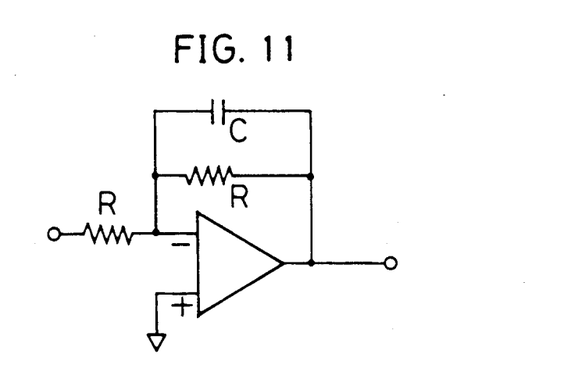
FIG. 11 shows a configuration of the first order lag circuit, FIG. 12 gives an example of the quasi-differential circuit.
Figure 12:
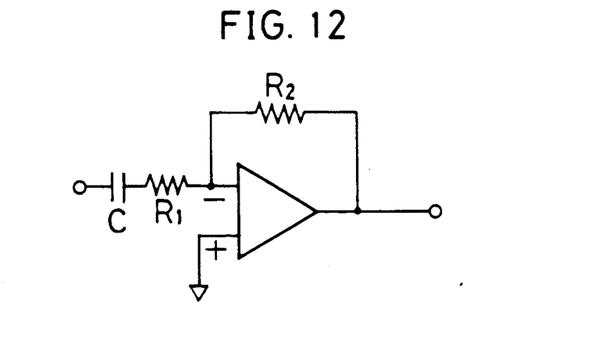

There are two methods to set up the principle of FIG. 7. One method is to measure the acceleration "a" as shown in FIG. 9 by the accelerometer and to set up a positive feedback loop through a first order lag circuit. The other method is to measure the velocity "v" as shown in FIG. 10 and to set up the positive feedback loop through a quasi-differential circuit. The first order lag circuit and the quasi-differential circuit used here can be easily set up by an operational amplifier, and the examples are given by FIG. 11 and FIG. 12. Thus, FIG. 9 can be expressed by:

$$G(S) = -\frac{1}{CRS + 1}$$

and FIG. 10 by:

$$G(S) = -\frac{R_2CS}{R_1CS + 1}$$

Figure 13:
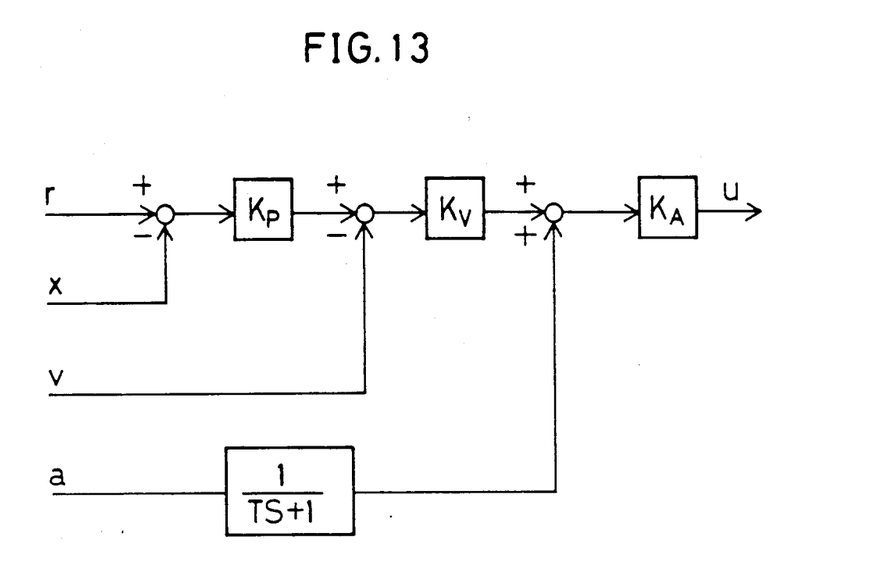
FIG. 13 and FIG. 14 are block diagrams showing the composition of the controller.
Figure 14:
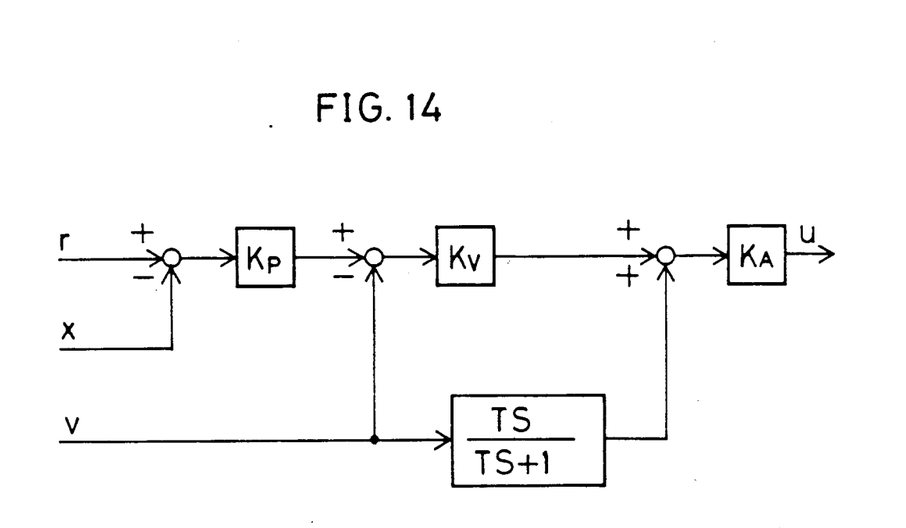

FIG. 13 and FIG. 14 are block diagrams representing the composition of the controller in the position control when these two controls are added.

Next, the effect of this invention will be clearly indicated by experimental data.

Figure 15:
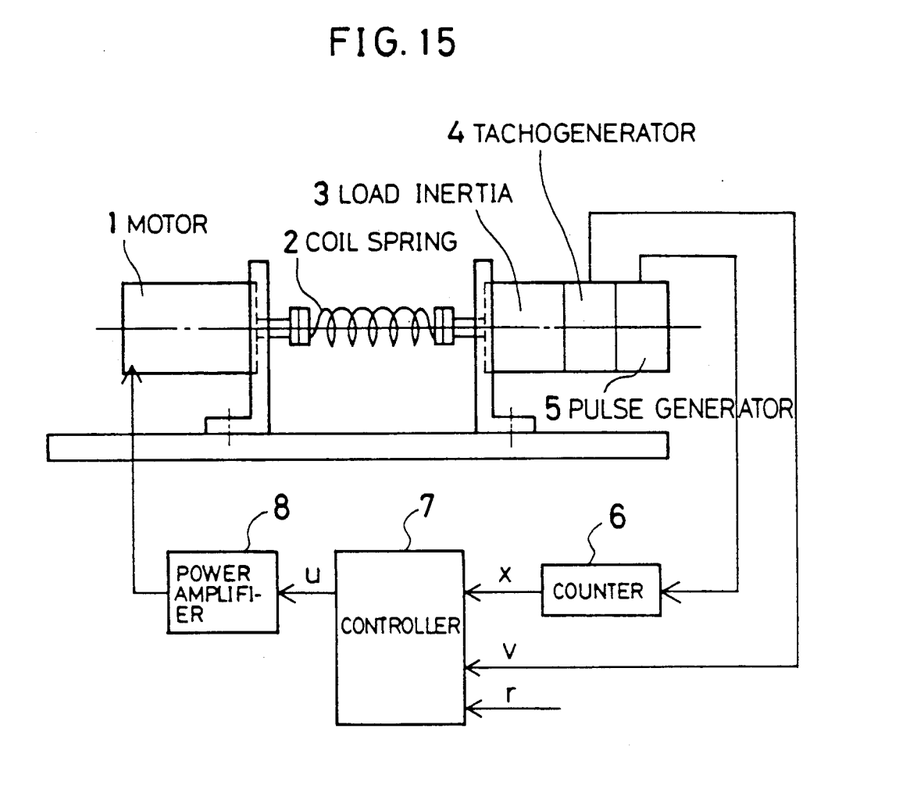
FIG. 15 represents the composition of an experimental apparatus, which is built up to confirm the effect of the position control system by this invention.

In FIG. 15, 1 refers to a motor, 2 a coil spring, 3 a load inertia, 4 a tachogenerator, 5 a pulse generator, 6 a counter, 7 a controller, and 8 a power amplifier. In this experimental apparatus, the motor 1 and the load inertia 3 are connected by the coil spring, setting up the vibration characteristics. The motor 1 is driven by the force command "u" through the power amplifier 8, and the load inertia 3 is driven through the coil spring 2. Thus, the position of the load inertia 3 is precisely controlled. The quantity to be measured is the position and the velocity of the load inertia 3, and each of these is measured by the pulse generator 5 and the tachogenerator 4. The pulse signal as output from the pulse generator 5 is integrated by the counter 6 and becomes the position "x". The position command "r", the position "x" and the velocity "v" are input to the controller 7, and the force command "u" is output. The composition of the experimental apparatus shown in FIG. 15 is basically the same as in FIG. 1.

Figure 16:
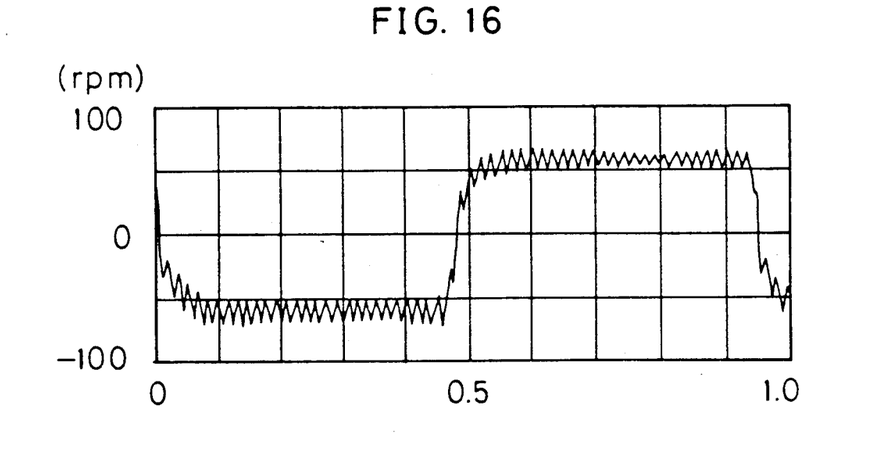
FIG. 16 shows the step response of the velocity control system built up according to the conventional position control system.

FIG. 16 shows the step response of the velocity control system as set up by the conventional position control system. The vibration characteristics of open loop are: Natural frequency 60 Hz, and damping ratio 0.01. In FIG. 16, the step response is almost at the stability limit when the velocity loop gain $K_v=17$ s$^{-1}$, and the vibration does not damp. Accordingly, the control loop of FIG. 14 for positive feedback of velocity through the quasi-differential circuit was added to this system.

Figure 17A:
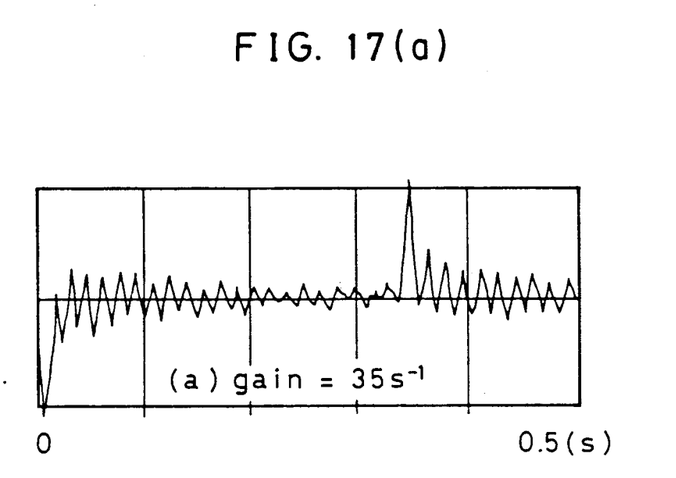
FIGS. 17(a)-17(b) show the vibration data at the step response of velocity.
Figure 17B:
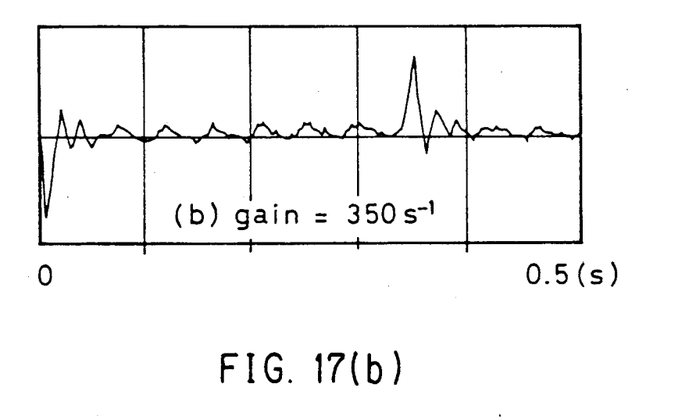

FIG. 17 represents the vibration data at the step response of velocity. FIG. 17 (a) shows the case of positive feedback gain $K_A=35$ s$^{-1}$, and FIG. 17 (b) the case of $K_A=350$ s$^{-1}$. Apparently, vibration is damping as the gain increases.

Figure 18:
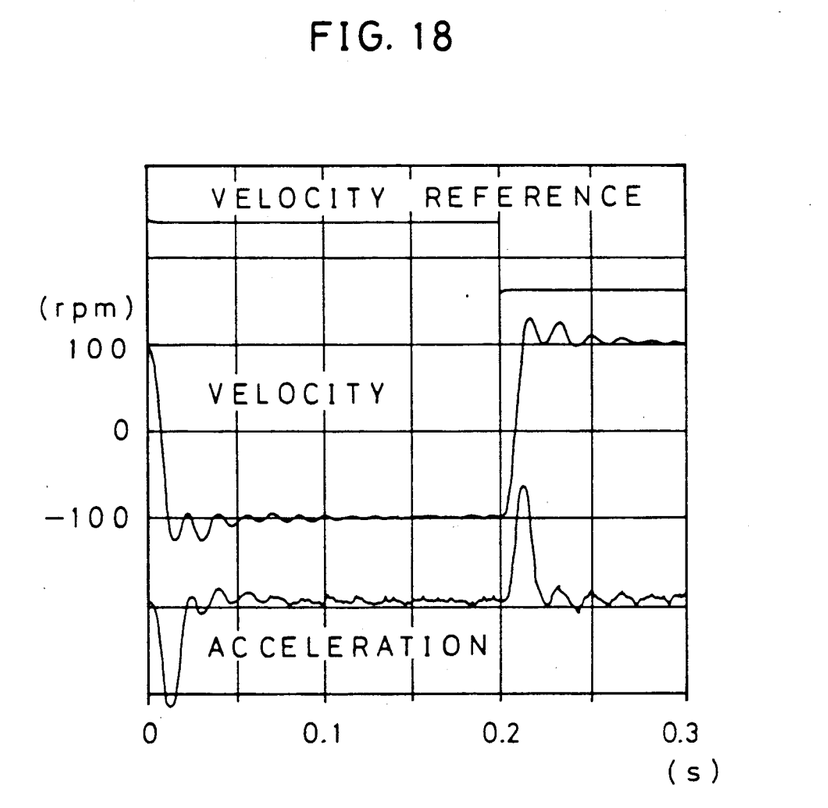
FIG. 18 shows the step response when $K_v$ is increased to 200 s$^{-1}$ under the condition of $K_A=35$ s$^{-1}$ of FIG. 17(b)

FIG. 18 shows the step response when $K_v$ is increased to 200 s$^{-1}$ under the condition of $K_A=350$ s$^{-1}$ of FIG.

17 (b). In FIG. 18, vibration is damped enough and response is quick despite the fact the gain is increased.

Figure 19:
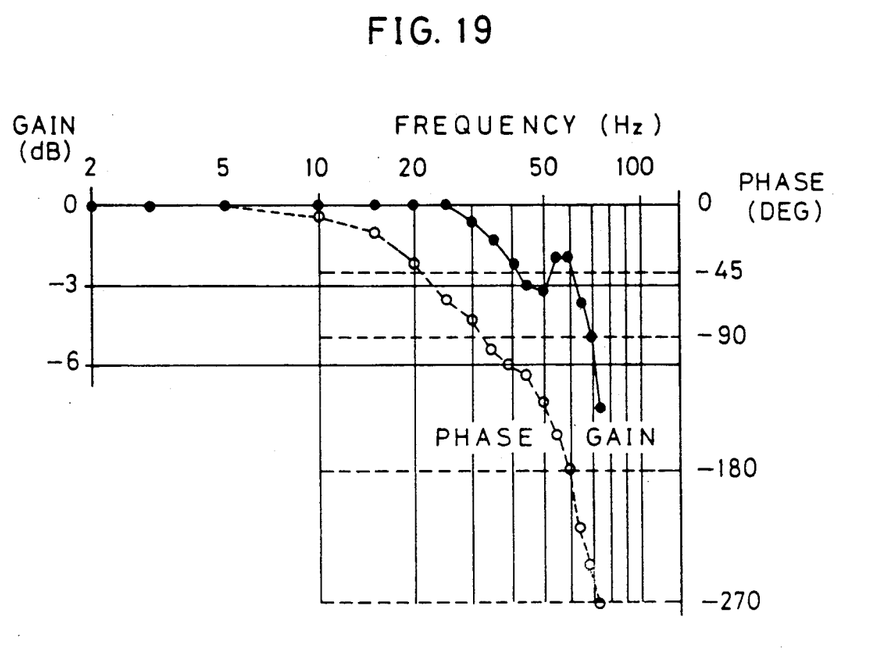
FIG. 19 is a Bode diagram showing the frequency response characteristics of the same system, and FIG. 20 gives the step response when the position control by this invention shown in FIG. 14 is ultimately achieved.

FIG. 19 is a Bode diagram showing the frequency response characteristics of the same system. When gain is −3 dB, the frequency is 45 Hz, and this is 0.75 times as high as the natural frequency. Further, the fact that the gain is −2 dB less at the natural frequency suggests that vibration is sufficiently damped.

Figure 20:
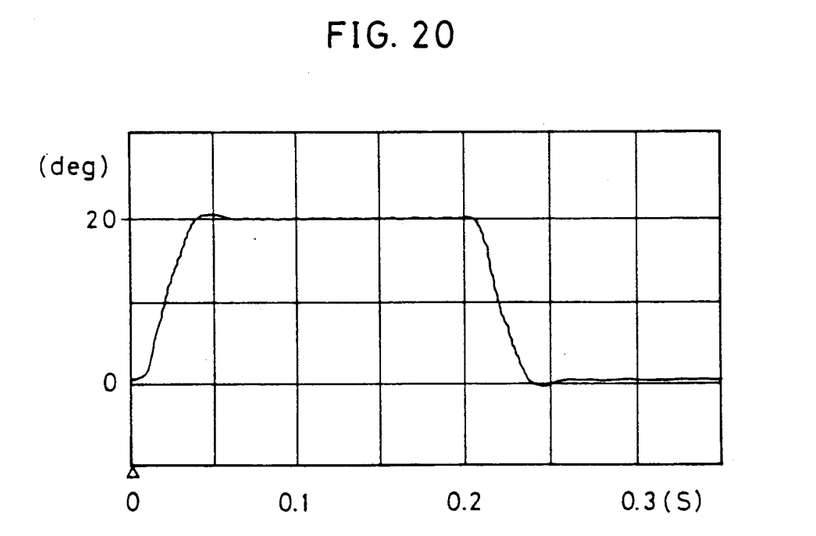

FIG. 20 shows the step response when the position control by this invention as shown in FIG. 14 is ultimately performed. The position control system having quick response with no vibration and with cutoff frequency (−3 dB) at 23 Hz is achieved. This is 0.38 times as high as the natural frequency. Comparing the stable system with the conventional control method, the gain, the response and the accuracy are improved by more than 10 times.

As it is evident from the above explanation, it is possible by the method of this invention to stabilize the vibration by positive feedback of the acceleration and to increase the gain of the position and velocity control system far more than the conventional method. Thus, the position control system with quick response and higher accuracy can be achieved. Further, there is no vibration response. It is also advantageous that it is achievable with a simple circuit configuration.

What we claim is:

1. A method of position control for stabilizing vibration characteristics of a position control system having force as a manipulated variable and position as a controlled variable, said method of position control comprising the steps of:
   performing negative feedback of the position of an object and velocity of said object from a position and velocity determining means to a control means; and
   performing positive feedback of acceleration of the object from an acceleration detecting means to the control means through a first order lag circuit which includes vibration characteristics of the position control system.

2. A method of position control for stabilizing vibration characteristics of a position control system having force as a manipulated variable and position as a controlled variable, said method of position control comprising the steps of:
   performing negative feedback of the position of an object and velocity of said object from a position and velocity determining means to a control means; and
   performing positive feedback of the velocity from a velocity detecting means to the control means through a quasi-differential circuit which includes vibration characteristics of the position control system.